United States Patent [19]

Wittkopf

[11] 4,341,525
[45] Jul. 27, 1982

[54] ADJUSTABLE MOUNTING FOR COOPERATING DIE CYLINDERS

[75] Inventor: Eugene W. Wittkopf, Suamico, Wis.

[73] Assignee: Magna-Graphics Corporation, Oconto Falls, Wis.

[21] Appl. No.: 192,322

[22] Filed: Sep. 29, 1980

[51] Int. Cl.³ .................. B23D 25/12; B26D 1/40
[52] U.S. Cl. ........................... 493/370; 83/344; 493/471
[58] Field of Search .................. 493/475, 471, 370, 60, 493/64, 354, 355, 367; 83/344, 343, 346, 348, 659, 677, 700, 699

[56] References Cited

U.S. PATENT DOCUMENTS

| | | | |
|---|---|---|---|
| 1,122,268 | 12/1914 | Feeley | 493/370 X |
| 1,289,084 | 12/1918 | Banzett | 493/370 X |
| 1,548,626 | 8/1925 | Pauls | 493/370 X |
| 3,448,684 | 6/1969 | Cardinet et al. | 83/344 X |
| 3,954,034 | 5/1976 | Broderick | 83/346 X |
| 3,965,786 | 6/1976 | D'Luhy | 83/346 |
| 4,205,596 | 6/1980 | Chesnut | 493/370 |
| 4,226,150 | 10/1980 | Reed | 83/344 X |

*Primary Examiner*—James F. Coan
*Attorney, Agent, or Firm*—James E. Nilles

[57] ABSTRACT

In apparatus having a pair of spaced apart cylinders rotatable on respective axes that are substantially parallel and lie in a common plane, each cylinder has at each end thereof a smaller diameter concentric bearer ring. Each bearer ring on each cylinder is adjacent to a bearer ring on the other. For each bearer ring there is a roller supporting member that is movable in directions parallel to said plane and transverse to said axes, each roller supporting member being adjacent to its bearer ring, between that bearer ring and an adjacent roller supporting member. Two rollers on each supporting member, at opposite sides of said plane, rollingly engage its bearer ring. An adjustable spacer member reacting between adjacent supporting members substantially on said plane hold them spaced apart by an adjustably variable distance that determines the distance between the cylinders. Other rollers spaced to opposite sides of said plane rollingly engage each bearer ring to confine it against radial displacement, at least certain of said other rollers being under bodily bias that urges the cylinders towards one another. Preferably, all rollers are spaced like distances from said plane.

11 Claims, 5 Drawing Figures

4,341,525

ADJUSTABLE MOUNTING FOR COOPERATING DIE CYLINDERS

FIELD OF THE INVENTION

This invention relates to apparatus wherein a pair of cooperating rotatable cylinders such as the cylinders of a machine for cutting and scoring paper or the like must normally be spaced apart by an accurately maintained distance notwithstanding that the cylinders impose substantially high radial displacement forces upon one another when the apparatus is in operation; and the invention is more particularly concerned with apparatus of that type wherein the distance between the cylinders is readily adjustable.

BACKGROUND OF THE INVENTION

A typical application of the present invention is in the art of embossing or cutting and scoring paper or similar material, wherein the work is accomplished by passing the material through the nip of a pair of rotating cylinders. In an earlier stage of the art, the design to be embossed, cut or scored was engraved on the surface of one of the cylinders itself, and when that engraved die cylinder became worn, it had to be discarded and replaced. Such an engraved die cylinder is very expensive, and therefore efforts have been directed to the provision of plate-like dies that can be attached to a cylinder in the manner of a printing plate so as to be replaceable without costly discard of the whole cylinder. In the current state of the art, the die is formed as a thin but sturdy flexible plate which is magnetically secured to the die cylinder.

Heretofore, however, attempts to employ such magnetic die plates have not been completely satisfactory, owing to limitations in the apparatus in which the die plates were used.

Conventionally, on each end of each of the cooperating cylinders there was fixed an accurately concentric bearer ring which had a somewhat larger radius than the cylinder proper. The cylinders were urged towards one another under substantial force whereby the bearer rings at adjacent ends of the cylinders were maintained in rolling engagement, and the distance between the surfaces of the two cylinders was thus fixed in dependence upon the differences in radius between the bearer rings and their respective cylinders. Each bearer ring was further engaged by a pair of rollers that were circumferentially spaced from one another and from the point of contact with the other bearer ring, and the forces that maintained the bearer rings engaged with one another were applied to them through these rollers. Each bearer ring, by its engagement with the rollers and the other bearer ring, was thus securely confined against radial motion.

The distance between the die cylinder and its cooperating anvil cylinder was intended to accommodate the thickness of the plate-like die carried by the die cylinder, and the fact that this distance was fixed gave rise to very troublesome problems in the use of such dies. In practice it is nearly impossible to produce a die plate with a thickness accurately matched to the cylinder-to-cylinder distance maintained by rollingly engaged bearer rings. Even if most of the die plate has the desired thickness, there is almost always some variation in thickness across the area of the plate. Although die plate thickness deviations are seldom very large, they were troublesome when the distance between cylinders was fixed. Portions of the die that were too thick were subject to relatively rapid wear, whereas portions that were too thin could not get close enough to the anvil cylinder to perform cutting and scoring functions effectively.

It was apparent that adjustability of the distance between cylinders would enable the cylinders to be spaced apart by whatever distance would best accommodate the thickness peculiarities of the particular die plate being used. If the cylinders could be adjusted to accommodate the thinnest portions of the die, the thickness of other portions would be reduced with use, bringing the die to a substantially uniform thickness. Furthermore, if the distance between the cylinders could be slightly reduced from time to time to compensate for wear on the die, the useful life of the die could be greatly prolonged and could be expected to exceed by a substantial amount the useful life of an engraved cylinder.

Heretofore, however, it has not been obvious how such adjustability of the distance between cylinders could be obtained while still providing for adequate support of the high radial forces imposed upon the cylinders.

It must be kept in mind that if the distance between the cylinders is adjustable, the adjusted distance between them must be accurately maintained while the cylinders are in rotation, and this requires that the cylinders be normally confined to rotation on rigidly fixed, accurately concentric axes. Since there is almost invariably a certain amount of eccentricity in a shaft and bearing support for a rotating cylinder, an adjustable cylinder-to-cylinder distance can not be accurately maintained by an attempted control of the positions of shaft bearings. Furthermore, radial forces that would be imposed upon the shaft bearings of embossing or die cutting cylinders would be likely to load those bearings to or above their rated capacities.

Thus the need for supporting relatively high radial forces on the cylinders while ensuring their accurately concentric rotation about axes that are normally fixed in relation to one another has heretofore appeared to be incompatible with adjustability of the distance between their axes so that the distance between the cylinders themselves can be brought to a desired value.

SUMMARY OF THE INVENTION

The present invention resolves this apparent incompatability, and thus its general object is to provide apparatus wherein a pair of cooperating rotatable cylinders that impose substantially high radial forces upon one another are confined to accurately concentric rotation about respective axes that are normally in rigidly fixed relation to one another, but wherein the distance between those axes is nevertheless adjustable so that the distance between the cylinders can be established and maintained at whatever value best accommodates the thickness of a die plate or the like that is carried by one of the cylinders.

More specifically, it is an object of the invention to provide structure comprising a relatively large diameter concentric bearer ring on each end of each of a pair of cooperating rotatable cylinders and rollers engaging each bearer ring at circumferentially spaced locations to confine the cylinder to rotation and sturdily support the radial forces to which the cylinder is subjected, which structure, notwithstanding its normal rigidity, nevertheless provides for quick and easy adjustment of the distance to be maintained between the cylinders, so that there can be accurate accommodation to the thickness variations of a particular die plate or the like that is being carried by one of the cylinders.

A further specific object of this invention is to provide structure which affords sturdy rotatable support to each of a pair of cooperating cylinders, assuring that their axes are maintained in a common plane and in a normally fixed substantially parallel relation to one another, but nevertheless enabling small adjustments to be made in the distance between the cylinders, including adjustments which will shift their axes towards and away from exact parallelism.

In general, the objects of the invention are achieved in apparatus wherein each of a pair of cooperating, spaced apart, rotatable cylinders has on each of its ends a concentric bearer ring which is of smaller diameter than the cylinder and is adjacent to a bearer ring on the other cylinder. The apparatus is further characterized by a rigid supporting member for each bearer ring, and quide means mounting the supporting members on a frame, for bodily motion of the supporting members in directions transverse to the cylinder axes and parallel to a plane that contains those axes, with each supporting member disposed adjacent to its bearer ring and with the supporting members for adjacent bearer rings adjacent to one another and between those bearer rings. Each supporting member carries a pair of roller elements that are confined to rotation relative to it, the roller elements on each supporting member being spaced to opposite sides of said plane and having rolling engagement with the bearer ring for the supporting member. A plurality of other roller elements are carried by said frame and confined to rotation relative to it, there being at least one of said other roller elements for each bearer ring, rollingly engaging the bearer ring in circumferentially spaced relation to the roller elements on the supporting member for the bearer ring and cooperating with them to confine the bearer ring against radial displacement. Adjustable spacer means reacting between adjacent supporting members substantially on said plane maintain those supporting members spaced apart by a distance which determines the distance between the cylinders.

Preferably the apparatus also comprises a pair of roller element carriers, one for each of the bearer rings on one of the cylinders, each of said roller element carriers being carried by the frame for movement in directions parallel to said plane and transverse to the cylinder axes. Each of said roller element carriers has a pair of said other roller elements mounted thereon and confined to rotation relative thereto at opposite sides of said plane, both rollingly engaged with the bearer ring for the roller element carrier. The apparatus further comprises means reacting between the frame and each of said roller element carriers to bias the latter in its direction of movement towards the other cylinder.

Preferably the adjustable spacer means comprises a shaft-like member, and the adjacent supporting members have grooves that open towards one another and wherein said shaft-like member is received. Said grooves and said shaft-like member have engaged surfaces arranged for wedging cooperation whereby axial motion of the shaft-like member in one direction forces the adjacent supporting members apart.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF INVENTION

Figure 1:
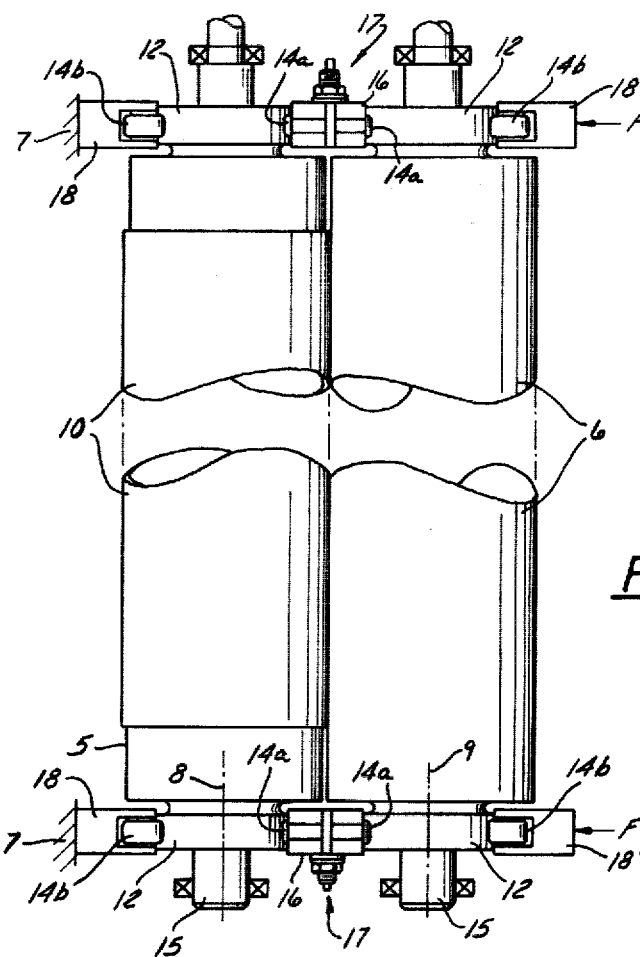
FIG. 1 is a more or less diagrammatic plan view of a pair of rotatable cylinders and their supporting means in apparatus that embodies the present invention.
Figure 2:
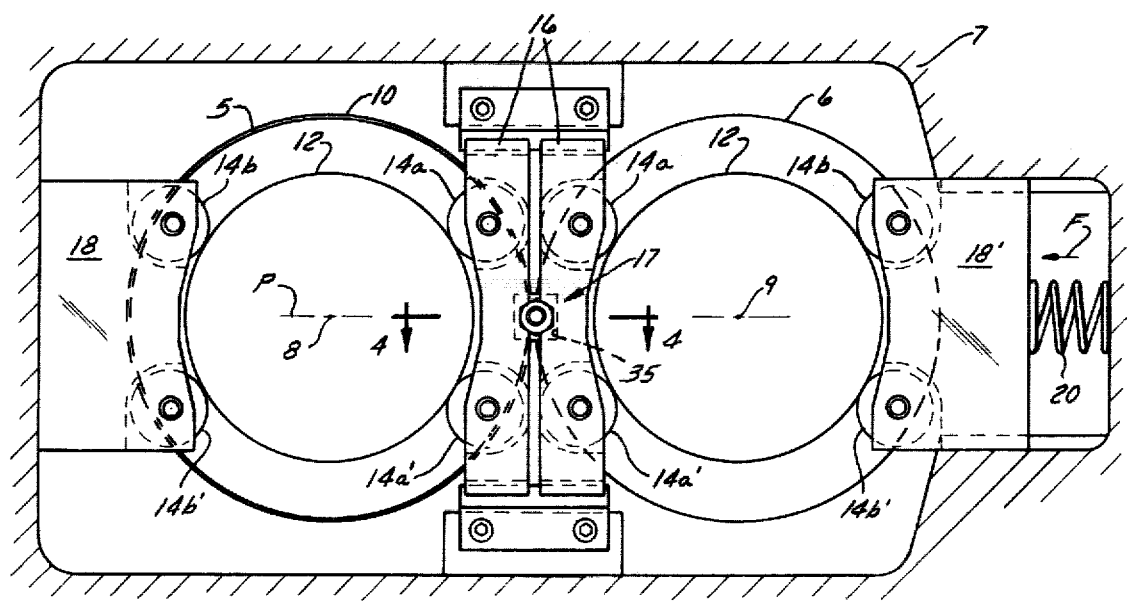
FIG. 2 is a view in said elevation of the cylinders and their supporting means in the apparatus shown in FIG. 1.

In the accompanying drawings, the numerals 5 and 6 designate cooperating cylinders which are supported on a frame 7 for rotation about respective normally fixed concentric axes 8 and 9. The axes 8 and 9 are contained in a common plane P and are substantially parallel to one another.

The cylinders 5 and 6 are spaced apart by a distance which is, in the present case, adjustably variable to accommodate the thickness of a plate-like element 10 that is attached to the surface of one of the cylinders 5. In the present case it is assumed for purposes of illustration that the element 10 is a cutting and scoring die which is magnetically attached in a known manner to the cylinder 5. The cylinder 5 thus constitutes a die cylinder, and the cylinder 6 is an anvil cylinder that can have a plain cylindrical surface with which the die 10 cooperates. The material acted upon by the die 10 is paper or the like which passes between the cylinders 5 and 6 as a moving web (not shown). For the die 10 to be effective on such material, the distance between the cylinders 5 and 6 must be such that, with no web present, the die just touches the surface of the anvil cylinder 6.

Each of the cylinders 5 and 6 has a concentric bearer ring 12 at each of its ends, and attention is directed to the fact that each bearer ring 12 is of substantially smaller diameter than its cylinder. The bearer rings 12 are preferably formed in one piece with their respective cylinders, to ensure accurate concentricity, and the concentric surface of each bearer ring is as nearly as possible perfectly cylindrical. All bearer rings 12 are preferably of the same diameter, although small differences in bearer ring diameters can be accommodated by reason of the adjustability of the apparatus of this invention. As best seen in FIG. 1, the opposed parallel mounting of the cylinders 5 and 6 so disposes them that each bearer ring on each cylinder is adjacent to a bearer ring on the other cylinder.

The cylinders 5 and 6 are rotatably supported on the frame 7 by means of rolling elements 14 which are preferably small rollers, each freely rotatable about an axis parallel to the axes 8 and 9 of the cylinders. As shown, there are four rollers 14a, 14a', 14b, 14b' for each bearer ring 12, rollingly engaging it at circumferentially spaced locations and preferably arranged symmetrically to the plane P that contains the cylinder axes as well as having certain symmetrical relationships to the cylinder axes themselves, as described hereinafter. Inasmuch as the several rollers 14 that engage each bearer ring are constrained to rotate on normally fixed axes, they fix the location of the bearer ring axis and thus normally confine the cylinder against radial displacement.

Each cylinder 5 and 6 has a concentric shaft 15 which projects axially beyond the bearer rings 12 at its opposite ends and through which the cylinder is rotatably driven in any suitable manner. Each shaft 15 is received in a bearing box 16 which is mounted on the frame for free movement in all radial directions but which is confined against axial motion and in turn cooperates with the shaft 15 to confine the cylinder against axial play.

For each of the bearer rings 12 there is a beam-like rigid supporting member 16 that is mounted on the machine frame 7 for motion in directions transverse to the cylinder axes 8 and 9 and parallel to the plane P that contains them. Each supporting member 16 is located adjacent to its bearer ring 12, and the supporting members 16 for adjacent bearer rings are located between those bearer rings and adjacent to one another. Thus there is a pair of adjacent supporting members 16 at each end of the cylinder pair 5, 6. Each supporting member 16 extends lengthwise across the plane P, and it carries two of the rollers 14a, 14a' that engage its bearer ring 12, spaced equal distances to opposite sides of that plane. Between each pair of adjacent supporting members 16 there is an adjustable spacer means 17 that holds them apart by an adjustable distance, and since the cylinders 5, 6 are urged towards one another as explained hereinafter, the adjustment of the spacer means 17 determines the distance between the cylinders.

The other two rollers 14b and 14b' for each bearer ring 12, which cooperate with the rollers 14a, 14a' that are carried by its supporting member 16, are confined to rotation on a roller carrier 18 which, like the supporting members 16, extends across the plane P and has its rollers spaced equal distances to opposite sides of that plane. There are thus two roller carriers 18 for each of the cylinders 5, 6, one for each of the bearer rings 12 on the cylinder, and each roller carrier 18 is at the opposite side of its bearer ring 12 from the supporting member 16 for that bearer ring. As shown, the two roller carriers 18 for the cylinder 5 are fixed to the machine frame 7, whereas the other two roller carriers 18', which are adjacent to the bearer rings of the cylinder 6, are slideable on the machine frame 7 in directions parallel to the plane P and transverse to the cylinder axes 8, 9. The slidable roller carriers 18' are strongly biased towards the fixed carriers 18. For simplicity, a strong spring 20, reacting against the frame 7, is shown for exerting the biasing force F upon the slidable roller carrier 18', but in practice a hydraulic ram is more likely to be used for this purpose. Obviously, both of the roller carriers 18, 18' could be movably mounted on the frame 7 and biased in directions to urge the cylinders 5, 6 towards one another.

Figure 5:
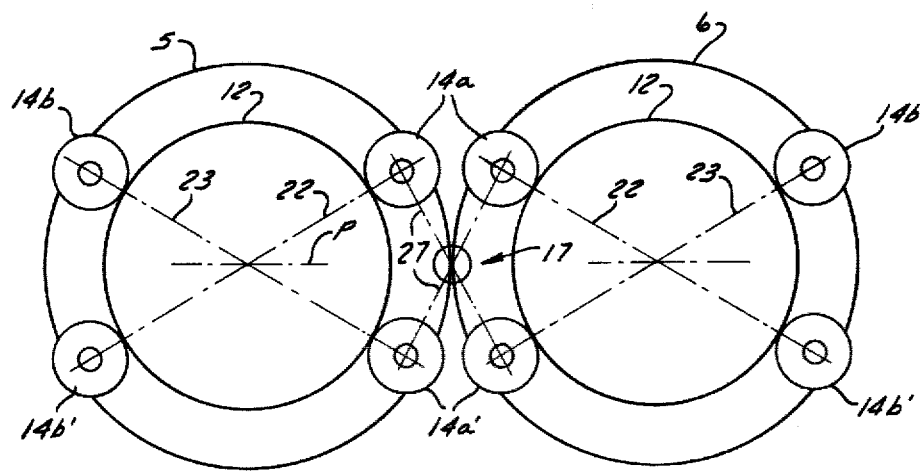
FIG. 5 is a diagrammatic view in side elevation showing how the forces imposed upon the cylinders are balanced and distributed to confine the cylinders against radial displacement.

The biasing forces F that are imposed by the spring 20 or its equivalent are strong enough to prevent the cylinders from moving apart in response to the forces they impose upon one another as they act upon a web or the like that passes between them. In general, these opposing bias and working forces are best supported by rollers 14 that are located as close as possible to the plane P of the cylinder axes; but of course rollers located on or near that plan afford inadequate support against forces which tend to shift the cylinders in directions transverse to that plane. On the other hand, any force parallel to the plane P imposes very large forces upon the rollers 14 if they are located too far from that plane. FIG. 5 illustrates an arrangement which affords adequately stable support for the cylinders 5, 6 without imposition of unduly large forces upon the rollers 14. As there shown, each roller 14a on a roller supporting member 16 is diametrically opposite the roller 14b' which engages the same bearer ring 12 and which is carried by a carrier 18, and the axes of those rollers lie on a line 22 which extends through the cylinder axis. The axes of the other two rollers 14a' and 14b that engage the same bearer ring lie on a line 23 that also extends through the cylinder axis. For a favorable disposition of the rollers, each of the lines 22, 23 is at an angle of about 15° to the plane P containing the cylinder axes, which is to say that the angle between the lines 22 and 23 is preferably on the order of 30°, and all rollers 14 are thus at like distances from the plane P.

For adequate support of the cylinders, every roller 14 must at all times have firm rolling engagement with its bearer ring 12, notwithstanding any slight play or eccentricity in the roller. To ensure that the rollers obtain such engagement under the biasing force F, the supporting elements 16 have certain freedoms for bodily motion that enable their rollers 14a and 14a' to position themselves for engagement with their bearer rings, and at least the roller carrier 18' has similar freedoms for bodily movement. The supporting members 16 have a tongue-and-groove connection 25 with the frame 7, or have a similar rail-like mounting, whereby they are guided for bodily motion in the directions parallel to the plane P and transverse to the cylinder axes and are substantially confined against motions transverse to that plane as well as against motions parallel to the cylinder axes. Furthermore, the rail-like guide means 25 allow each supporting member 16 to have a small amount of freedom for rotation about an axis which extends lengthwise through it, so that the supporting member can automatically assume a position of such rotation at which its rollers 14a, 14a' will have good line contact with the bearer ring 12 that they rollingly engage. The movable roller carrier 18' is similarly mounted on the frame 7, to give it the same constraints and freedoms with respect to it bodily motions.

The adjustable spacer means 17 that reacts between adjacent supporting members 16 engages each of them substantially only on the plane P and defines a rocking axis for each that is parallel to the cylinder axes and about which the supporting member can rock or tilt toward and from its adjacent supporting member, thus, again, ensuring that the rollers 14a and 14a' on each supporting member 16 can assume positions in which they have firm rolling engagement with their bearer rings 12. As can be seen from FIG. 5, the rocking axes for the two adjacent supporting members coincide with one another and are contained in the plane P, and the lines 27 that connect the axis of each roller 14a with the opposite roller 14a' on the other supporting member 16 intersect one another on that rocking axis. Because of this relationship, cylinder-to-cylinder forces in directions parallel to the plane P have no unbalanced components transverse to that plane, and the axes of the cylinders 5 and 6 tend to maintain fixed locations notwithstanding the rockable connection between the supporting members 16.

In each of its illustrated embodiments the spacer means 17 comprises a shaft-like spacer member 29 that is confined between the two adjacent supporting members 16 for wedging cooperation with them. The spacer member 29 has coaxial front and rear threaded portions 30 and 31, respectively, between which there is a larger diameter medial portion 32. In each of the adjacent roller supporting members 16 there is a rearwardly extending groove 33 of arcuate cross-section that opens to the corresponding groove 33 in the other so that said grooves cooperate to define a hole in which the shaft-like member 29 is confined to axial motion while it, in turn, pivots each of the supporting members 16 for rocking about its axis. Each groove 33 opens rearwardly to an enlarged nut pocket 35 of non-circular cross-section that is in the rear of its supporting member 16, and the pockets 35 in the adjacent supporting members cooperate to non-rotatably confine a nut 36 in coaxial relation to the shaft-like member 29. Thus, the rear threaded portion 31 of the shaft-like member 29 can be engaged in the nut 36, and by means of a non-circular head 37 on its front end that member can be rotated to draw its larger diameter medial portion 32 rearwardly in the grooves 33 to wedge the supporting members apart. When the shaft-like member 29 has been brought to a desired position of adjustment, it is locked against rotation out of that position by means of another nut 38 on its front threaded portion 30, tightened against the substantially coplanar flat front surfaces of the supporting members.

The engagement between the enlarged medial portion 32 of the spacer member 29 and the surfaces of the grooves 33 is confined to an axially short zone so as not to interfere with the above mentioned freedom of the roller supporting members 16 to turn about axes that extend along their lengths.

Figure 3:
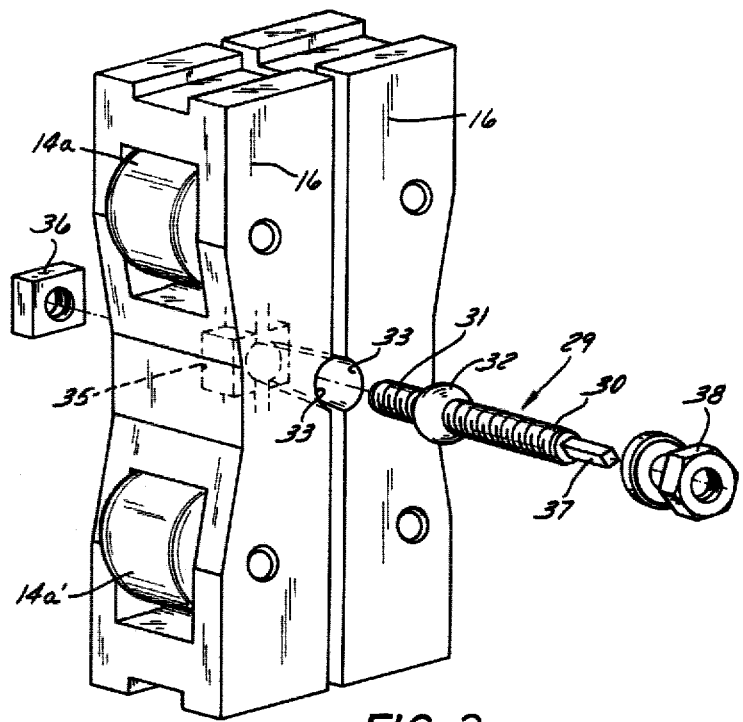
FIG. 3 is a detail perspective view on an enlarged scale of a pair of supporting members and spacer means for adjustably fixing the distance between them, the spacer means being shown in disassembled relation to the supporting members.

In the embodiment of the spacer means 17 that is illustrated in FIG. 3 the wedging cooperation between the spacer member 29 and the grooves 33 is provided for by reason of the fact that each of the grooves 33 tapers rearwardly along its length, its arcuate cross-section being of rearwardly decreasing radius but being at every point concentric to the axis defined by the spacer member 29. The medial portion 32 of the spacer member is essentially just a land which makes only line contact with the surface of each groove 33. Thus, rearward adjustment of the spacer member 29 wedges apart the adjacent roller supporting members 16 by reason of the taper of the grooves 33.

Figure 4:
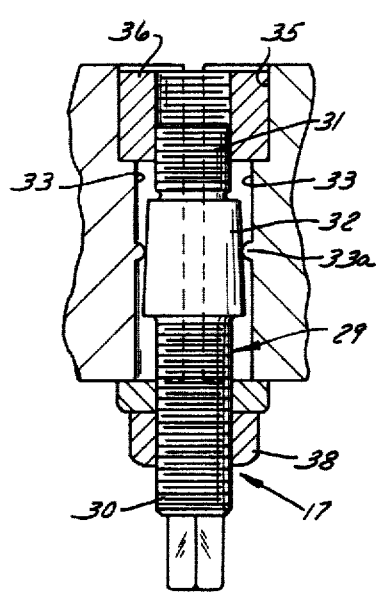
FIG. 4 is a fragmentary view in section, on an enlarged scale, taken on the plane of the line 4—4 in FIG. 2 and showing a modified form of adjustable spacer means.

In the embodiment of the invention illustrated in FIG. 4, the medial portion 32 of the spacer member 29 is axially rather long and frustoconical with a rearward taper, and each of the arcuate-section grooves 33 is of uniform radius along its length except at a circumferential land 33a intermediate its front and rear ends that engages the tapered portion 32 of the shaft-like member 29.

It will be apparent that the spacing between the adjacent supporting members 16 of each pair is adjustable independently of the spacing between the other pair of supporting members. Therefore, if the thickness peculiarities of a die or the like require the space between the cylinders 5 and 6 to be slightly wider at one end than at the other, so that their axes are slightly out of true parallelism, the apparatus of the present invention readily lends itself to such an adjustment.

From the foregoing description taken with the accompanying drawings it will be apparent that this invention provides apparatus wherein the distance between a pair of spaced apart rotatable cylinders is adjustably variable notwithstanding that the respective concentric axes of the cylinders are normally maintained in rigidly fixed relation to one another and very sturdy support is provided for high radial displacement forces which the cylinders impose upon one another when in operation.

What is being claimed is:

1. Apparatus comprising a pair of spaced apart cylinders carried by a frame for a cooperation that causes said cylinders to impose substantially high radial displacement forces upon one another, said cylinders being rotatable about respective concentric axes that are contained in a common plane and are normally fixed in substantially parallel relation to one another, said apparatus being characterized by:
   A. each of said cylinders having on each end thereof a concentric bearer ring which
      (1) is of smaller diameter than the cylinder and
      (2) is adjacent to a bearer ring on the other cylinder;
   B. a rigid supporting member for each bearer ring;
   C. guide means mounting said supporting members on the frame for bodily motion in directions parallel to said plane and transverse to said axes, with each supporting member disposed adjacent to its bearer ring and with the supporting members for adjacent bearer rings adjacent to one another and between those bearer rings;
   D. a pair of roller elements carried by each of said supporting members and confined to rotation relative thereto, the roller elements on each supporting member
      (1) being spaced to opposite sides of said plane and
      (2) having rolling engagement with the bearer ring for the supporting member;
   E. a plurality of other roller elements carried by said frame and confined to rotation relative to it, there being at least one of said other roller elements for each bearer ring, each rollingly engaging the bearer ring in circumferentially spaced relation to the roller elements on the supporting member for the bearer ring and cooperating with them to confine the bearer ring against radial displacement; and
   F. adjustable spacer means reacting between adjacent supporting members substantially on said plane to maintain those supporting members spaced apart by a distance which depends upon the adjustment of the spacer means and which determines the distance between said cylinders.

2. The apparatus of claim 1, further characterized by: there being two of said other roller elements for each bearer ring, spaced to opposite sides of said plane.

3. The apparatus of claim 2, further characterized by: all of said roller elements and said other roller elements being spaced at like distances from said plane, so that all roller elements engaging every bearer ring are disposed in symmetrical relation to one another relative to its axis and said plane.

4. The apparatus of claim 1, further characterized by:
   (a) a pair of roller element carriers, one for each of the bearer rings on one of said cylinders, each of said roller element carriers being carried by said frame for movement in directions parallel to said plane and transverse to said axes;

(b) each of said roller element carriers having a pair of said other roller elements mounted thereon and confined to rotation relative thereto at opposite sides of said plane, both rollingly engaged with the bearer ring for the roller element carrier; and (c) means reacting between said frame and each of said roller element carriers to bias the latter in its direction of movement towards the other cylinder.

5. The apparatus of claim 1, further characterized by:

(a) said adjustable spacer means comprising a shaft-like member, and (b) said adjacent supporting members having grooves that open towards one another and wherein said shaft-like member is received, said grooves and said shaft-like member having engaged surfaces arranged for wedging cooperation whereby axial motion of said shaft-like member in one direction forces said adjacent supporting members apart.

6. The apparatus of claim 5, wherein said grooves are arranged to dispose said shaft-like member with its axis substantially in said plane and parallel to the axes of said cylinders, so that each of the adjacent supporting members can rock relative to the other substantially about the axis of said shaft-like member.

7. The apparatus of claim 5 wherein each of said adjacent supporting members has a recess therein to which its said groove opens and which opens to the recess in the other adjacent supporting member, and wherein said shaft-like member has a threaded end portion, further characterized by:

a nut confined against rotation in said recesses and in which said threaded end portion of the shaft-like member is received so that axial adjustment of said shaft-like member can be effected by rotation thereof.

8. Apparatus of the type comprising a pair of cooperating cylinders, each having a concentric bearer ring on each end of it, a frame on which said cylinders are carried in spaced apart relationship for rotation about respective axes that are substantially parallel and are contained in a common plane and with each bearer ring on each cylinder adjacent to a bearer ring on the other cylinder, and a plurality of roller elements for each bearer ring, substantially confined to rotation relative to the frame and rollingly engaging the bearer ring at circumferentially spaced locations to confine it against radial motion, at least certain of said roller elements being under bodily biasing force whereby the cylinders are urged towards one another, said apparatus being characterized by:

A. each of said bearer rings being of smaller diameter than its cylinder; and

B. means for maintaining said cylinders spaced apart by an adjustably variable distance, comprising (1) a roller supporting member for each bearer ring, each roller supporting member being mounted on said frame, adjacent to its bearer ring, for movement in directions transverse to said axes and parallel to said plane, the roller supporting members for adjacent bearer rings being adjacent to one another and between those bearer rings, (2) a pair of other roller elements confined to rotation on each of said roller supporting members at opposite sides of said plane, and (3) adjustable spacer means reacting between the roller supporting members of each adjacent pair thereof to hold them spaced apart by an adjustably variable distance which determines the distance between said cylinders.

9. The apparatus of claim 8 wherein said adjustable spacer means comprises:

(a) an elongated spacer member confined between the roller supporting members of each adjacent pair thereof and constrained by them to lengthwise motion in adjusting directions parallel to the cylinder axes, (b) cooperating wedge means on said spacer member and the roller supporting members between which it is confined, whereby motion of said spacer member in one of said adjusting directions forces those roller supporting members apart, and (c) cooperating means on said spacer member and the roller supporting members between which it is confined for holding said spacer member in any position of its lengthwise motion.

10. The apparatus of claim 9 wherein each of said spacer members is shaft-like and wherein each of said roller supporting members has a groove of arcuate cross section which opens to the corresponding groove in the adjacent roller supporting member and cooperates therewith to receive a spacer member and confine it to adjusting motion, said grooves being located and arranged to dispose said spacer member with its axis in said plane and parallel to the axes of the cylinders and to pivot each roller supporting member on its adjacent spacer member for rocking motion about the axis thereof.

11. The apparatus of claim 8 wherein said plurality of roller elements for each bearer ring comprises, in addition to said two other roller elements confined to rotation on the roller supporting member for the bearer ring, two roller elements that are spaced to opposite sides of said plane and are at the side of the bearer ring opposite said two other roller elements, all of the roller elements being spaced at like distances from said plane.

* * * * *